United States Patent
Liou et al.

(10) Patent No.: US 12,457,316 B1
(45) Date of Patent: Oct. 28, 2025

(54) THREE-DIMENSIONAL DISPLAY DEVICE AND DISPLAY METHOD

(71) Applicant: Innolux Corporation, Miaoli County (TW)

(72) Inventors: Hao-Yu Liou, Miaoli County (TW); Wei-Yi Lu, Miaoli County (TW); Ruey-Jer Weng, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/795,187

(22) Filed: Aug. 6, 2024

(30) Foreign Application Priority Data

Jul. 18, 2024 (CN) .......................... 202410967915.3

(51) Int. Cl.
*H04N 13/32* (2018.01)
*H04N 13/383* (2018.01)
*H04N 13/398* (2018.01)

(52) U.S. Cl.
CPC ........... *H04N 13/32* (2018.05); *H04N 13/383* (2018.05); *H04N 13/398* (2018.05)

(58) Field of Classification Search
CPC ..................................................... H04N 13/32
See application file for complete search history.

(56) References Cited

FOREIGN PATENT DOCUMENTS

| CN | 104079919 | 8/2016 |
|---|---|---|
| EP | 3454553 | 3/2019 |

OTHER PUBLICATIONS

"Search Report of Europe Counterpart Application", issued on Aug. 29, 2025, p. 1-p. 10.

*Primary Examiner* — Y Lee
(74) *Attorney, Agent, or Firm* — JCIPRNET

(57) ABSTRACT

Provided are a three-dimensional display device and a display method. An eye tracking device of the three-dimensional display device tracks a left eye position and a right eye position. A processor generates a plurality of views. A plurality of light splitting units of a display of the three-dimensional display device distribute a plurality of beams of light emitted by a plurality of light emitting units. The processor calculates opening angles and light paths of the plurality of beams of light emitted by the plurality of light emitting units passing through the plurality of light splitting units to generate viewpoints through which the plurality of beams of light pass. The processor performs a light intensity comparison and post-processing on views corresponding to the at least one of the plurality of left eye viewpoints and the at least one of the plurality of right eye viewpoints.

20 Claims, 9 Drawing Sheets

THREE-DIMENSIONAL DISPLAY DEVICE AND DISPLAY METHOD

CROSS-REFERENCE TO RELATED APPLICATION

This application claims the priority benefit of China application serial no. 202410967915.3, filed on Jul. 18, 2024. The entirety of the above-mentioned patent application is hereby incorporated by reference herein and made a part of this specification.

BACKGROUND

Technical Field

The disclosure relates to a display technology, and more particularly to a three-dimensional display device and a display method.

Description of Related Art

Conventional naked-eye three-dimensional displays require a splitting device to ensure that a plurality of pixels on the display have their own restricted output angles when displaying a three-dimensional image, and an algorithm is required to allow the left eye and right eye to receive different parallax images. However, since the pixel point may not be a perfect point light source, it is easy to cause light misalignment, resulting in image crosstalk between the images seen by the left eye and the right eye, and the three-dimensional image becomes blurred and double images appears.

SUMMARY

The disclosure is for a three-dimensional display device and a display method, which may provide a good three-dimensional image display method.

According to an embodiment of the disclosure, a three-dimensional display device includes an eye tracking device, a processor, and a display. The eye tracking device is configured to track a left eye position and a right eye position. The processor is coupled to the eye tracking device and configured to calculate a plurality of left eye viewpoints and a plurality of right eye viewpoints according to the left eye position and the right eye position and generate a plurality of views. The display is coupled to the eye tracking device and the processor. The display includes a plurality of light emitting units and a plurality of light splitting units. The plurality of light emitting units are configured to emit plurality of beams of light. The plurality of light splitting units are configured to distribute the plurality of beams of light emitted by the plurality of light emitting units. The processor calculates opening angles and light paths of the plurality of beams of light emitted by the plurality of light emitting units passing through the plurality of light splitting units to generate viewpoints through which the plurality of beams of light pass. At least one beam of the plurality of beams of light passes through at least one of the plurality of left eye viewpoints and at least one of the plurality of right eye viewpoints simultaneously. The processor performs a light intensity comparison and post-processing on views corresponding to the at least one of the plurality of left eye viewpoints and the at least one of the plurality of right eye viewpoints.

According to the embodiments of the disclosure, the display method includes the following process. A left eye position and a right eye position are tracked through the eye tracking device. A plurality of left eye viewpoints and a plurality of right eye viewpoints are calculated according to the left eye position and the right eye position and a plurality of views are generated. A plurality of beams of light are emitted through a plurality of light emitting units of the display. A plurality of beams of light emitted by the plurality of light emitting units are distributed through a plurality of light splitting units of the display. Opening angles and light paths of the plurality of beams of light emitted by the plurality of light emitting units passing through the plurality of light splitting units are calculated to generate viewpoints through which the plurality of beams of light pass. At least one beam of the plurality of beams of light passes through at least one of the plurality of left eye viewpoints and at least one of the plurality of right eye viewpoints simultaneously; and a light intensity comparison and post-processing is performed on views corresponding to at least one of the plurality of left eye viewpoints and at least one of the plurality of right eye viewpoints.

Based on the above, the three-dimensional display device and the display method in the disclosure may automatically adjust the light intensity of the view corresponding to at least one left eye viewpoint or at least one right eye viewpoint to reduce image crosstalk.

In order to make the aforementioned features and advantages of the disclosure comprehensible, embodiments accompanied with drawings are described in detail below.

DESCRIPTION OF THE EMBODIMENTS

Figure 1:
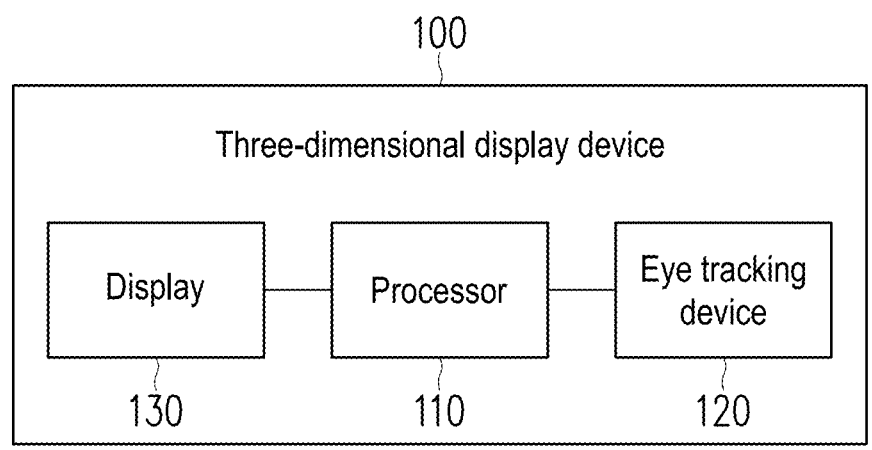
FIG. 1 is a schematic view of the three-dimensional display device according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and the description to indicate the same or similar parts.

In the description of the disclosure and the appended claims, certain terms will be used to refer to specific elements. Persons skilled in the art would understand that display device manufacturers may refer to the same elements under different names. This disclosure does not intend to distinguish between elements that have the same functions but different names. In the following description and claims, the words "having" and "including" are open-ended words and thus should be interpreted as meaning "including but not limited to."

In some embodiments of the disclosure, terms such as "coupling", "interconnecting", etc., may refer to two structures being in direct contact, or may refer to two structures that are not in direct contact, and in which some other structure is located between the two structures, unless specifically defined. Furthermore, the terms "joint" and "connection" may also include cases where both structures are movable or both structures are fixed. In addition, the term "couple" includes any direct and indirect electrical connection means.

Ordinal numbers such as "first", "second" and the like used in the specification and claims of the disclosure are used to modify elements, which do not imply and represent that the elements are numbered in sequence, or represent the order of a certain element and another element, or the order of the manufacturing method. The use of these ordinal numbers is only used to clearly distinguish the element with a certain name from another element with the same name. The same wording may not be used in claims of the disclosure and the specification. Accordingly, the first component in the specification may be the second component in claims of the disclosure. It should be understood that the following embodiments may replace, reorganize, and mix the technical features in several different embodiments to complete other embodiments without departing from the spirit of the disclosure.

The display device described in the disclosure may include a virtual reality device, an augmented reality device, a head-up display module, a transparent display module, a sensing device, or a spliced device, but is not limited thereto. The display module may be a bendable or flexible electronic device. The display device may be a non-self-luminescence type display module or a self-luminescence type display module. The sensing device may be a sensing device for sensing capacitance, light, thermal energy or ultrasonic waves, but not limited thereto. The display device may include, for example, electronic components such as passive component and active component, such as a capacitor, a resistor, an inductor, a diode, a transistor, and the like. The diode may include a light emitting diode or a photodiode. The light emitting diode may include, for example, an inorganic light emitting diode, an organic light emitting diode (OLED), a mini LED, a micro LED, or a quantum dot LED, but is not limited thereto. The splicing device may be, for example, a display splicing device, but is not limited thereto. It should be noted that the display device may be any combination of the above, but not limited thereto.

It should be understood that the features in several different embodiments may be replaced, reorganized, and mixed to complete other embodiments without departing from the spirit of the disclosure.

FIG. 1 is a schematic view of the three-dimensional display device according to an embodiment of the disclosure. Referring to FIG. 1, a three-dimensional display device 100 includes a processor 110, an eye tracking device 120, and a display 130. The processor 110 is coupled to the eye tracking device 120 and the display 130. In this embodiment, the three-dimensional display device 100 may be a naked-eye three-dimensional image display device having a three-dimensional image display function, but the disclosure is not limited thereto. In this embodiment, the display 130 may display a three-dimensional image, and the eye tracking device 120 may track the user's left eye position and right eye position to calculate a plurality of left eye viewpoints and a plurality of right eye viewpoints on a viewing plane and generate a plurality of views for display at the plurality of left eye viewpoints and the plurality of right eye viewpoints.

In this embodiment, the processor 110 may include, for example, a central processing unit (CPU), a graphics processing unit (GPU), or other programmable general purpose or special purpose microprocessors, digital signal processors (DSPs), application specific integrated circuits (ASICs), programmable logic devices (PLDs), other similar processing circuits, or combinations of these devices.

In this embodiment, the eye tracking device 120 may include an image sensing element having a depth information sensing function. The eye tracking device 120 may be configured to determine the left eye and the right eye of the user, and may locate the left eye position and the right eye position of the left eye and the right eye of the user in a space.

In this embodiment, the display 130 may include, for example, liquid crystal or a light emitting diode. The light emitting diode may include, for example, an organic light emitting diode (OLED), a mini LED, a micro LED, a quantum dot (QD) LED, fluorescence, phosphor, or other suitable materials, and the materials may be arranged and combined in any manner, but are not limited thereto.

Figure 2:
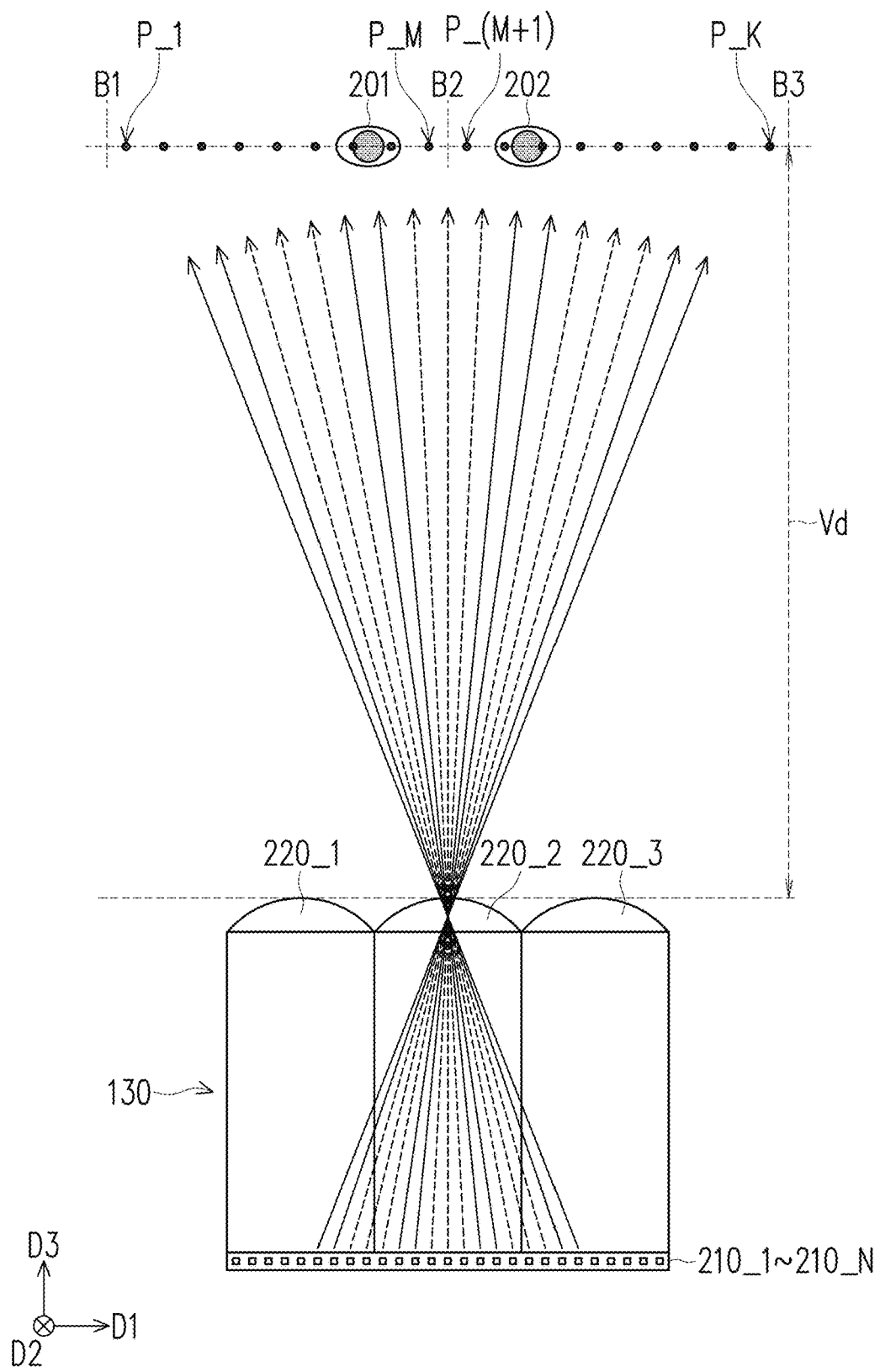
FIG. 2 is a schematic view of the structure of the display according to an embodiment of the disclosure.

FIG. 2 is a schematic view of the structure of the display according to an embodiment of the disclosure. Referring to FIG. 1 and FIG. 2, a partially schematic view of the display 130 is described below. In this embodiment, the display 130 of FIG. 1 may include a plurality of light emitting units 210_1 to 210_N and a plurality of light splitting units 220_1 to 220_3 as shown in FIG. 2, where N is a positive integer. The display surface of the display 130 may be parallel to a plane formed by a direction D1 and a direction D2 extending respectively, and may display a three-dimensional image toward a direction D3. The directions D1 to D3 are perpendicular to each other. The user may view the display 130 in a direction opposite to the direction D3. As shown in FIG. 2, there may be a distance Vd between a left eye 201 and a right eye 202 of the user and the display surface of the display 130. In this embodiment, the light emitting units 210_1 to 210_N may correspond to a plurality of display pixels and be configured to emit a plurality of beams of light. The light splitting units 220_1 to 2203 may be plurality of lenses and are configured to split the plurality of beams of light emitted by at least one portion of the light emitting units 210_1 to 210_N.

As shown in FIG. 2, the plurality of beams of light shown as solid lines may be incident on the left eye 201 and the right eye 202 of the user separately, or may not be within the range of visibility of the left eye 201 and the right eye 202 of the user, and thus usually have a lower image crosstalk. On the contrary, the plurality of beams of light shown as dotted lines may be incident on the left eye 201 and the right eye 202 of the user respectively, resulting in higher image crosstalk. In addition, the influence of the image crosstalk may change accordingly as the positions of the left eye 201 and the right eye 202 of the user or the distance Vd from the display surface of the display 130 change.

Figure 3:
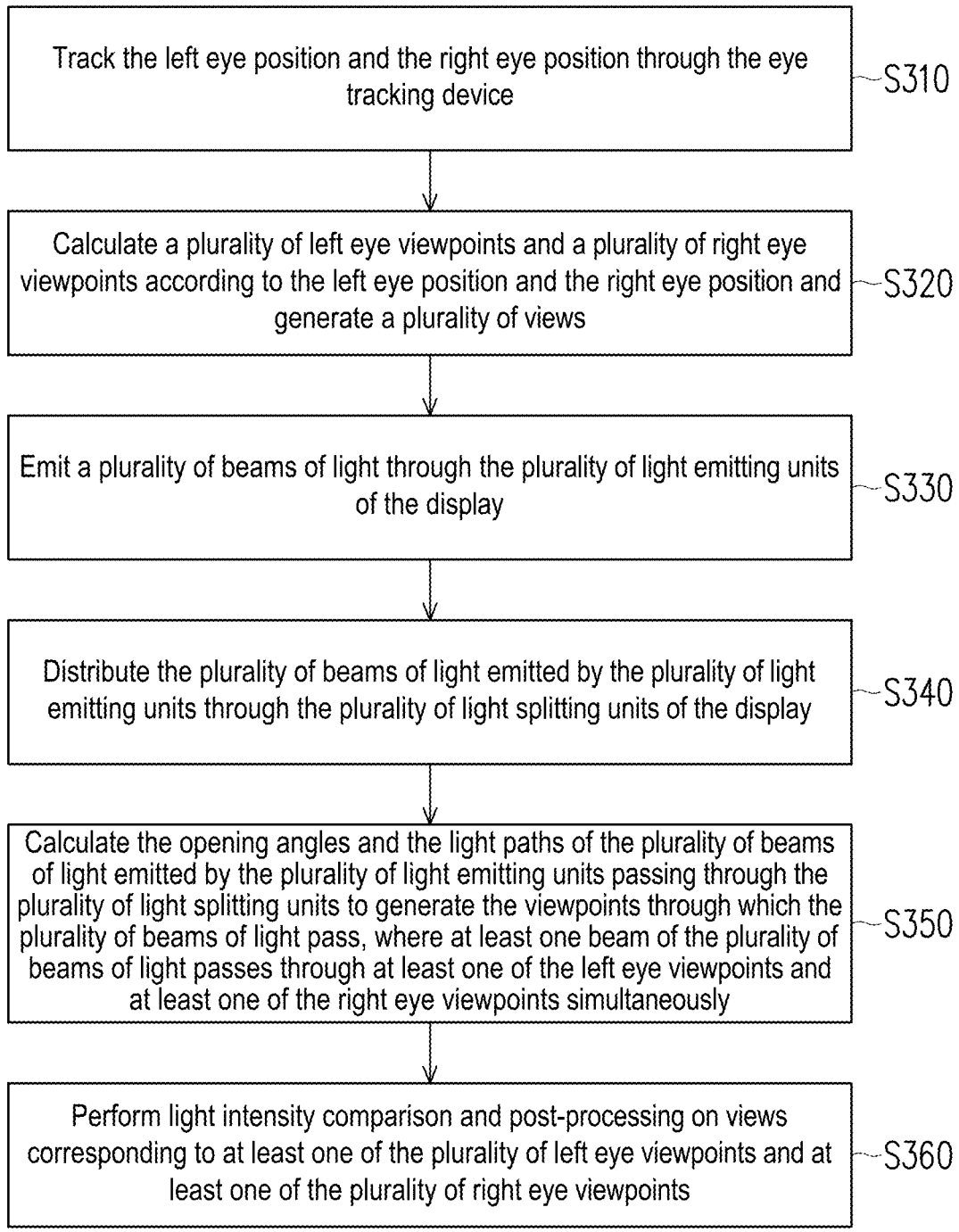
FIG. 3 is a flow chart of the display method according to an embodiment of the disclosure.

FIG. 3 is a flow chart of the display method according to an embodiment of the disclosure. Referring to FIG. 1 and FIG. 3, the three-dimensional display device 100 may perform the following steps S310 to S360. In step S310, the processor 110 may track the left eye position and the right eye position through the eye tracking device 120. In step S320, the processor 110 may calculate a plurality of left eye viewpoints P_1 to P_M and a plurality of right eye viewpoints P_(M+1) to P_K according to the left eye position and the right eye position and generate a plurality of views. In this embodiment, the processor 110 may detect the left eye 201 and the right eye 202 of the user through the eye tracking device 120, and the processor 110 calculates a plurality of left eye viewpoints P_1 to P_M and a plurality of right eye viewpoints P_(M+1) to P_K according to the left eye position of the left eye 201 and the right eye position of the right eye 202 and generates a plurality of views. As shown in FIG. 2, a middle reference line B2 of the left eye viewpoint P_1 to P_M and the right eye viewpoint P_(M+1) to P_K may be determined by taking the mid line of the positions of the left eye 201 and the right eye 202 of the user. A border B1 of the left eye viewpoint P_1 to P_M and a border B2 of the right eye viewpoint P_(M+1) to P_K may be determined by an opening angle and a light path of the light splitting unit 220_2.

In step S330, the processor 110 may emit a plurality of beams of light through the light emitting units 210_1 to 210_N of the display 130. In step S340, the light splitting units 220_1 to 220_3 of the display 130 distribute the plurality of beams of light emitted by the light emitting units 210_1 to 210_N. In step S350, the processor 110 may calculate the opening angles and the light paths of the plurality of beams of light emitted by the light emitting units 210_1 to 210_N passing through the light splitting units 220_1 to 220_3 to generate the viewpoints through which the plurality of beams of light pass, where at least one beam of the plurality of beams of light passes through at least one of the left eye viewpoints P_1 to P_M and at least one of the right eye viewpoints P_(M+1) to P_K simultaneously. In this embodiment, taking the light splitting unit 220_2 as an example, the processor 110 may first calculate the opening angles and the light paths of the plurality of beams of light emitted by at least one portion of the light emitting units 210_1 to 210_N passing through the light splitting unit 220_2 and generate the viewpoints through which the plurality of beams of light pass. In this embodiment, at least one of the plurality of beams of light may simultaneously pass through at least one of the left eye viewpoints P_1 to P_M and at least one of the right eye viewpoints P_(M+1) to P_K. In other words, the left eye 201 and the right eye 202 of the user may view an image with crosstalk.

In step S360, a light intensity comparison and post-processing is performed on views corresponding to at least one of the plurality of left eye viewpoints and at least one of the plurality of right eye viewpoints. In this embodiment, the processor 110 of this embodiment may perform the light intensity comparison and post-processing on views corresponding to at least one of the left eye viewpoints P_1 to P_M and at least one of the right eye viewpoints P_(M+1) to P_K, so as to effectively improve the problem of image crosstalk. In this regard, the specific implementation methods of comparing and post-processing the light intensity of views will be described in detail by the following embodiments.

Figure 4:
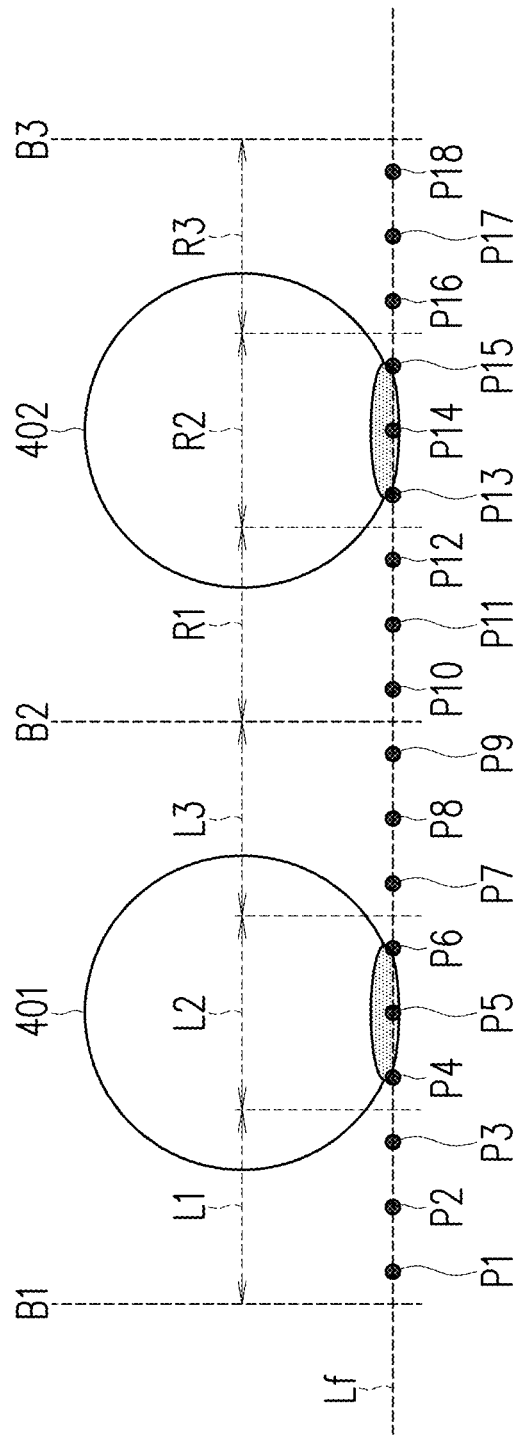
FIG. 4 is a schematic view showing the distribution of viewpoints according to an embodiment of the disclosure.

FIG. 4 is a schematic view showing the distribution of viewpoints according to an embodiment of the disclosure. Referring to FIG. 1 and FIG. 4, in this embodiment, the processor 110 may calculate a plurality of left eye viewpoints P1 to P9 and a plurality of right eye viewpoints P10 to P18 according to the left eye position of a left eye 401 and the right eye position of a right eye 402. As shown in FIG. 4, the middle reference line B2 of the left eye viewpoints P1 to P9 and the right eye viewpoints P10 to P18 may be determined by taking the mid line of the positions of the left eye 401 and the right eye 402 of the user. The border B1 of the left eye viewpoint P1 to P9 and the border B2 of the right eye viewpoint P10 to P18 may be determined by the opening angle and the light path of the corresponding light splitting unit.

In this embodiment, the left eye viewpoints P1 to P9 and the right eye viewpoints P10 to P18 may be uniformly distributed on a reference line Lf parallel to the viewing plane. In this embodiment, the processor 110 may select a left standard viewpoint from at least one of the left eye viewpoints P1 to P9, where the left standard viewpoint may correspond to the light intensity of a left standard view. Furthermore, the processor 110 may select a right standard viewpoint from at least one of the right eye viewpoints P10 to P18, where the right standard viewpoint corresponds to the light intensity of a right standard view. In this embodiment, the processor 110 may perform the light intensity comparison and post-processing on views corresponding to at least one of the left eye viewpoints P1 to P9 and at least one of the right eye viewpoints P10 to P18 according to the following Equation (1) and Equation (2).

$$Rv' = Rv - |Rv - Ls| \times Ra \qquad \text{Equation (1)}$$

$$Lv' = Lv - |Lv - Rs| \times La \qquad \text{Equation (2)}$$

In the above Equation (1) and Equation (2), Rv' is a light intensity of a view corresponding to any one of the right eye viewpoints P10 to P18 for comparison and post-processing, Rv is a light intensity of a view corresponding to any one of the right eye viewpoints P10 to P18, Ls is the light intensity of the left standard view corresponding to the left standard viewpoint, Ra is a first ratio value, Lv' is a light intensity of a view corresponding to any one of the left eye viewpoints P1 to P9 for comparison and post-processing, Lv is a light intensity of a view corresponding to any one of the left eye viewpoints P1 to P9, Rs is the light intensity of the right standard view corresponding to the right standard viewpoint, and La is the second ratio value. In this embodiment, the first ratio value is proportional to a right eye crosstalk rate, and the second ratio value is proportional to a left eye crosstalk rate.

In this embodiment, the processor 110 may also first define a high crosstalk region and a low crosstalk region according to the left eye position of the left eye 401 and the right eye position of the right eye 402, so as to perform the light intensity comparison and post-processing on the view corresponding to the high crosstalk region. Specifically, the processor 110 may first calculate a plurality of crosstalk rates of the plurality of beams of light emitted by the plurality of light emitting units of the display 130, define a viewpoint region corresponding to a portion among the plurality of crosstalk rates being greater than or equal to a first crosstalk rate threshold value and less than or equal to a second crosstalk rate threshold value as a high crosstalk region, and define a viewpoint region corresponding to a portion among the plurality of crosstalk rates being less than the first crosstalk rate threshold value as a low crosstalk region. In one embodiment, the first crosstalk rate threshold value may be, for example, 5%, and the second crosstalk rate threshold value may be, for example, 95%, but the disclosure is not limited thereto.

In this regard, as shown in FIG. 4, a region L2 corresponding to the pupil range of the left eye 401 may be a low crosstalk region, and regions L1 and L3 on two sides of the pupil range of the left eye 401 may be high crosstalk region. A region R2 corresponding to the pupil range of the right eye 402 may be a low crosstalk region, and regions R1 and R3 on two sides of the pupil range of the right eye 402 may be a high crosstalk region. However, the range definition of the high crosstalk region and the low crosstalk region of the disclosure is not limited thereto. In this embodiment, the processor 110 may perform the light intensity comparison and post-processing on views corresponding to at least one of the plurality of left eye viewpoints and at least one of the plurality of right eye viewpoints in the high crosstalk region.

It should be noted that, in one embodiment, when the high crosstalk region is located between a left eye center and a right eye center and more than two viewpoints are located in the high crosstalk region, a plurality of first ratio values corresponding to different right eye viewpoints decrease as approaching the right eye position, and a plurality of second ratio values corresponding to different left eye viewpoints decrease as approaching the left eye position. Furthermore, when the high crosstalk region is located outside a pair of eyes and more than two viewpoints are located in the high crosstalk region, first ratio values corresponding to different right eye viewpoints decrease as approaching the right eye position, and second ratio values corresponding to different left eye viewpoints decrease as approaching the left eye position. In other words, a viewpoint close to the pupil range may have a smaller crosstalk rate and thus a lower ratio value. Exemplarily, the viewpoint P7, for example, corresponds to a ratio value of 5%. The viewpoint P8, for example, corresponds to a ratio value of 10%. The viewpoint P9, for example, corresponds to a ratio value of 20%. The viewpoint P10, for example, corresponds to a ratio value of 20%. The viewpoint P11, for example, corresponds to a ratio value of 10%. The viewpoint P12, for example, corresponds to a ratio value of 5%. For another example, the viewpoint P1, for example, corresponds to a ratio value of 20%. The viewpoint P2, for example, corresponds to a ratio value of 10%. The viewpoint P3, for example, corresponds to a ratio value of 5%. The viewpoint P16, for example, corresponds to a ratio value of 5%. The viewpoint P17, for example, corresponds to a ratio value of 10%. The viewpoint P18, for example, corresponds to a ratio value of 20%. However, the numerical definition of the ratio value in the disclosure is not limited thereto. In another embodiment, different right eye viewpoints may also correspond to the same first ratio value, and different left eye viewpoints may also correspond to the same second ratio value.

In this embodiment, the processor 110 may compare the region L3 and the region R1 having high crosstalk, and adjust the light intensity of the view corresponding to at least one of the viewpoints in the region L3 and the region R1 according to the above Equation (1) and Equation (2). For example, the viewpoint P7 corresponds to a view with a light intensity of 128 (i.e., brightness value or grayscale value). The viewpoint P8 corresponds to a view with a light intensity of 255. The viewpoint P9 corresponds to a view with a light intensity of 54. The viewpoint P10 corresponds to a view with a light intensity of 255. The viewpoint P11 corresponds to a view with a light intensity of 128. The viewpoint P12 corresponds to a view with a light intensity of 64. The processor 110 may select the viewpoint P8 as the left standard viewpoint and may select the viewpoint P12 as the right standard viewpoint.

For example, all viewpoints correspond to the same ratio value of 0.5 (i.e., 50%). For the viewpoint P7, the processor 110 may, according to the above Equation (2), perform subtraction between the light intensity 128 of the viewpoint P7 and the light intensity 64 of the viewpoint P12 (right standard viewpoint) and take the absolute value to obtain the value "64", and then multiply the value "64" by the ratio value 0.5 to obtain the value "32". Thus, the light intensity of the viewpoint P7 after processing is "96" (i.e., =128-32).

For the viewpoint P8, the processor 110 may, according to the above Equation (2), perform subtraction between the light intensity 255 of the viewpoint P8 and the light intensity 64 of the viewpoint P12 (right standard viewpoint) and take the absolute value to obtain the value "191", and then multiply the value "191" by the ratio value 0.5 to obtain the value "96" (since the brightness value has no decimal value, this is the rounded result of 95.5). Thus, the light intensity of the viewpoint P8 after processing is "159" (i.e., =255-96).

For the viewpoint P9, the processor 110 may, according to the above Equation (2), perform subtraction between the light intensity 54 of the viewpoint P9 and the light intensity 64 of the viewpoint P12 (right standard viewpoint) and take the absolute value to obtain the value "10", and then multiply the value "10" by the ratio value 0.5 to obtain the value "5". Thus, the light intensity of the viewpoint P9 after processing is "49" (i.e., =54-5).

For the viewpoint P10, the processor 110 may, according to the above Equation (1), perform subtraction between the light intensity 255 of the viewpoint P10 and the light intensity 255 of the viewpoint P8 (left standard viewpoint) and take the absolute value to obtain the value "0". Thus, the light intensity of the viewpoint P10 remains at 255.

For the viewpoint P11, the processor 110 may, according to the above Equation (1), perform subtraction between the light intensity 128 of the viewpoint P11 and the light intensity 255 of the viewpoint P8 (left standard viewpoint) and take the absolute value to obtain the value "127", and then multiply the value "127" by the ratio value 0.5 to obtain the value "64" (i.e., the rounded result of 63.5). Thus, the light intensity of the viewpoint P11 after processing is "64" (i.e., =128-64).

For the viewpoint P12, the processor 110 may, according to the above Equation (1), perform subtraction between the light intensity 64 of the viewpoint P12 and the light intensity 255 of the viewpoint P8 (left standard viewpoint) and take the absolute value to obtain the value "191", and then multiply the value "191" by the ratio value 0.5 to obtain the value "96" (i.e., the rounded result of 95.5). Thus, the light intensity of the viewpoint P11 after processing is "0" (because the lowest brightness value is 0).

In this way, the processor 110 may appropriately reduce the light intensity of views corresponding to a plurality of viewpoints in the region L3 and the region R1 with high crosstalk, so as to effectively reduce the impact of the crosstalk.

However, in one embodiment, according to the following equations (1) and (2), light intensity comparison post-processing is performed on the images corresponding to at least one of the left eye viewpoints P1 to P9 and at least one of the right eye viewpoints P10 to P18.

$$Rv'=Rv-|Rv-Ls|\times Ra \qquad \text{Equation (1)}$$

$$Lv'=Lv-|Lv-Rs|\times La \qquad \text{Equation (2)}$$

In the above Equation (1) and Equation (2), Rv' is a light intensity of a view corresponding to any one of the right eye viewpoints P10 to P18 for comparison and post-processing, Rv is a light intensity of a view corresponding to any one of the right eye viewpoints P10 to P18, Ls is the light intensity of the left standard view corresponding to the left standard viewpoint, Ra is a first ratio value, Lv' is a light intensity of a view corresponding to any one of the left eye viewpoints P1 to P9 for comparison and post-processing, Lv is a light intensity of a view corresponding to any one of the left eye viewpoints P1 to P9, Rs is the light intensity of the right standard view corresponding to the right standard viewpoint, and La is the second ratio value. In this embodiment, the first ratio value is proportional to a right eye crosstalk rate, and the second ratio value is proportional to a left eye crosstalk rate. When the value of the compared post-processed light intensity (Rv') of the view corresponding to any one of the right eye viewpoints P10 to P18 is less than the first threshold, the processor 110 maintains the original light intensity of the view corresponding to any one of the right eye viewpoints P10 to P18. Furthermore, when the value of the compared post-processed light intensity (Lv') of the view corresponding to any one of the left eye viewpoints P1 to P9 is less than the second threshold, the processor 110 maintains the original light intensity of the view corresponding to any one of the left eye viewpoints P1 to P9.

It should be noted that the first threshold value and the second threshold value may be the minimum one of the currently compared light intensity and the standard light intensity, but the disclosure is not limited thereto. In one embodiment, the first threshold value and the second threshold value may also be other default values.

To further illustrate with the above example, for the viewpoint P7, the processor 110 may, according to the above Equation (2), perform subtraction between the light intensity 128 of the viewpoint P7 and the light intensity 64 of the viewpoint P12 (right standard viewpoint) and take the absolute value to obtain the value "64", and then multiply the value "64" by the ratio value 0.5 to obtain the value "32". Thus, the light intensity of the viewpoint P7 after processing is "96" (i.e., =128−32).

For the viewpoint P8, the processor 110 may, according to the above Equation (2), perform subtraction between the light intensity 255 of the viewpoint P8 and the light intensity 64 of the viewpoint P12 (right standard viewpoint) and take the absolute value to obtain the value "191", and then multiply the value "191" by the ratio value 0.5 to obtain the value "96" (since the brightness value has no decimal value, this is the rounded result of 95.5). Thus, the light intensity of the viewpoint P8 after processing is "159" (i.e., =255−96).

For the viewpoint P9, the processor 110 may, according to the above Equation (2), perform subtraction between the light intensity 54 of the viewpoint P9 and the light intensity 64 of the viewpoint P12 (right standard viewpoint) and take the absolute value to obtain the value "10", and then multiply the value "10" by the ratio value 0.5 to obtain the value "5". Thus, the processed light intensity of the viewpoint P9 is "49" (i.e., 49=54−5). In this regard, since the value "49" is smaller than the light intensity 54 of the viewpoint P9 (second threshold value), the processor 110 maintains the light intensity of viewpoint P9 (Since the light intensity 54 of the viewpoint P9 is smaller than the right standard viewpoint, the second threshold value is the light intensity value of the viewpoint P9).

For the viewpoint P10, the processor 110 may, according to the above Equation (1), perform subtraction between the light intensity 255 of the viewpoint P10 and the light intensity 255 of the viewpoint P8 (left standard viewpoint) and take the absolute value to obtain the value "0". Thus, the light intensity of the viewpoint P10 remains at 255.

For the viewpoint P11, the processor 110 may, according to the above Equation (1), perform subtraction between the light intensity 128 of the viewpoint P11 and the light intensity 255 of the viewpoint P8 (left standard viewpoint) and take the absolute value to obtain the value "127", and then multiply the value "127" by the ratio value 0.5 to obtain the value "64" (since the brightness value has no decimal value, this is the rounded result of 63.5). Thus, the processed light intensity of the viewpoint P9 is "64" (i.e., 64=128−64). In this regard, since the value "64" is smaller than the light intensity 128 of the viewpoint P11 (first threshold value), the processor 110 maintains the light intensity of viewpoint P11 (Since the light intensity 128 of the viewpoint P11 is smaller than the left standard viewpoint, the first threshold value is the light intensity value of the viewpoint P11).

For the viewpoint P12, the processor 110 may, according to the above Equation (1), perform subtraction between the light intensity 64 of the viewpoint P12 and the light intensity 255 of the viewpoint P8 (left standard viewpoint) and take the absolute value to obtain the value "191", and then multiply the value "191" by the ratio value 0.5 to obtain the value "96" (i.e., the rounded result of 95.5). Thus, the light intensity of the viewpoint P12 after processing is "−32" (i.e., −32=64−96). In this regard, since the value "−32" is smaller than the light intensity 128 of the viewpoint P12 (first threshold value), the processor 110 maintains the light intensity of viewpoint P12.

In this way, the processor 110 may also appropriately reduce the light intensity of views corresponding to a plurality of viewpoints in the region L3 and the region R1 with high crosstalk, so as to effectively reduce the impact of the crosstalk.

In another embodiment of the disclosure, the processor 110 may also compare the region L1 and the region R3 having high crosstalk, and adjust the light intensity of the view corresponding to at least one of the viewpoints in the region L1 and the region R3 according to the above Equation (1) and Equation (2). The method of adjusting the light intensity of the view corresponding to the viewpoint in the region L1 and the region R3 may be inferred from the above examples, and details are not repeated herein.

Figure 5:
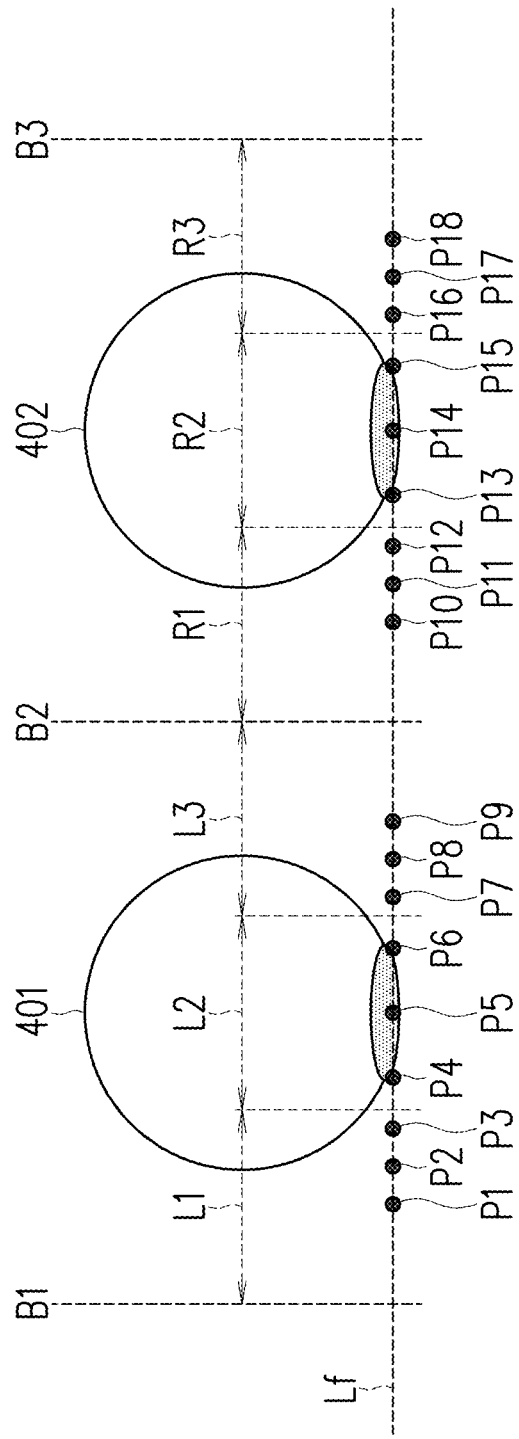
FIG. 5 is a schematic view showing the distribution of viewpoints according to another embodiment of the disclosure.

FIG. 5 is a schematic view showing the distribution of viewpoints according to another embodiment of the disclosure. Referring to FIG. 1 and FIG. 5, in one embodiment, the left eye viewpoints P1 to P9 and the right eye viewpoints P10 to P18 may also be non-uniformly distributed on a reference line Lf parallel to the viewing plane. In this regard, the left eye viewpoints P1 to P3 and P7 to P9 may approach the pupil region of the left eye 401 to reduce the ghosting effect of the image seen by the left eye 401. The right eye viewpoints P10 to P12 and P16 to P18 may approach the pupil region of the right eye 402 so as to reduce the ghosting effect of the image seen by the right eye 402. Furthermore, the processor 110 may also perform the light intensity comparison and processing on the left eye viewpoints P1 to P9 and the right eye viewpoints P10 to P18 of FIG. 5 as described in the embodiment of FIG. 4, so as to effectively improve the image crosstalk seen by the left eye 401 and the right eye 402.

Figure 6:
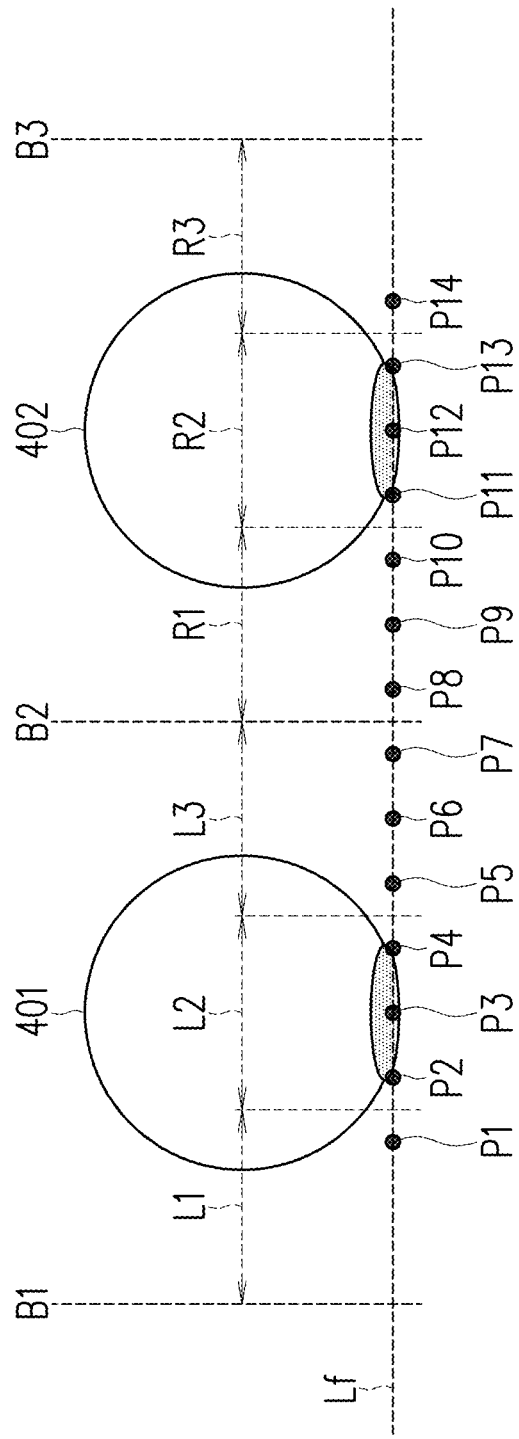
FIG. 6 is a schematic view showing the distribution of viewpoints according to another embodiment of the disclosure.

FIG. 6 is a schematic view showing the distribution of viewpoints according to another embodiment of the disclosure. Referring to FIG. 1 and FIG. 6, in one embodiment, the left eye viewpoints P1 to P7 and the right eye viewpoints P8 to P14 are distributed on a reference line Lf parallel to the viewing plane. Moreover, the viewpoint amount of region L3 (high crosstalk region) is greater than the viewpoint amount of region L1 (high crosstalk region). The viewpoint amount of region R1 (high crosstalk region) is greater than the viewpoint amount of region R3 (high crosstalk region). In this regard, the processor 110 may also perform the light intensity comparison and processing on the left eye viewpoints P1, P5 to P7 and the right eye viewpoints P8 to P10 and P14 of FIG. 6 as described in the embodiment of FIG. 4, so as to effectively improve the image crosstalk seen by the left eye 401 and the right eye 402.

Figure 7:
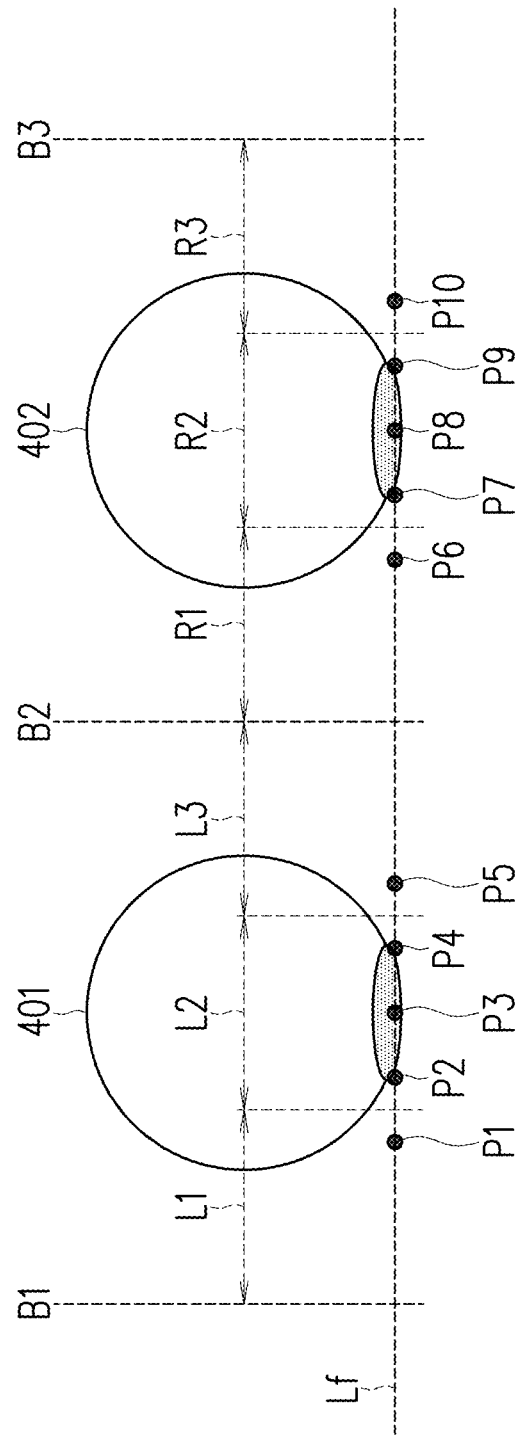
FIG. 7 is a schematic view showing the distribution of viewpoints according to another embodiment of the disclosure.

FIG. 7 is a schematic view showing the distribution of viewpoints according to another embodiment of the disclosure. Referring to FIG. 1 and FIG. 7, in one embodiment, the left eye viewpoints P1 to P5 and the right eye viewpoints P6 to P10 are distributed on a reference line Lf parallel to a viewing plane. In addition, the viewpoint amount of region L1 (high crosstalk region) is equal to the viewpoint amount of region R3 (high crosstalk region). The viewpoint amount of region L3 (high crosstalk region) is equal to the viewpoint amount of region R1 (high crosstalk region). In this regard, the processor 110 may also perform the light intensity comparison and processing on the left eye viewpoints P1 and P5 and the right eye viewpoints P9 and P10 of FIG. 7 as described in the embodiment of FIG. 4, so as to effectively improve the image crosstalk seen by the left eye 401 and the right eye 402.

Figure 8:
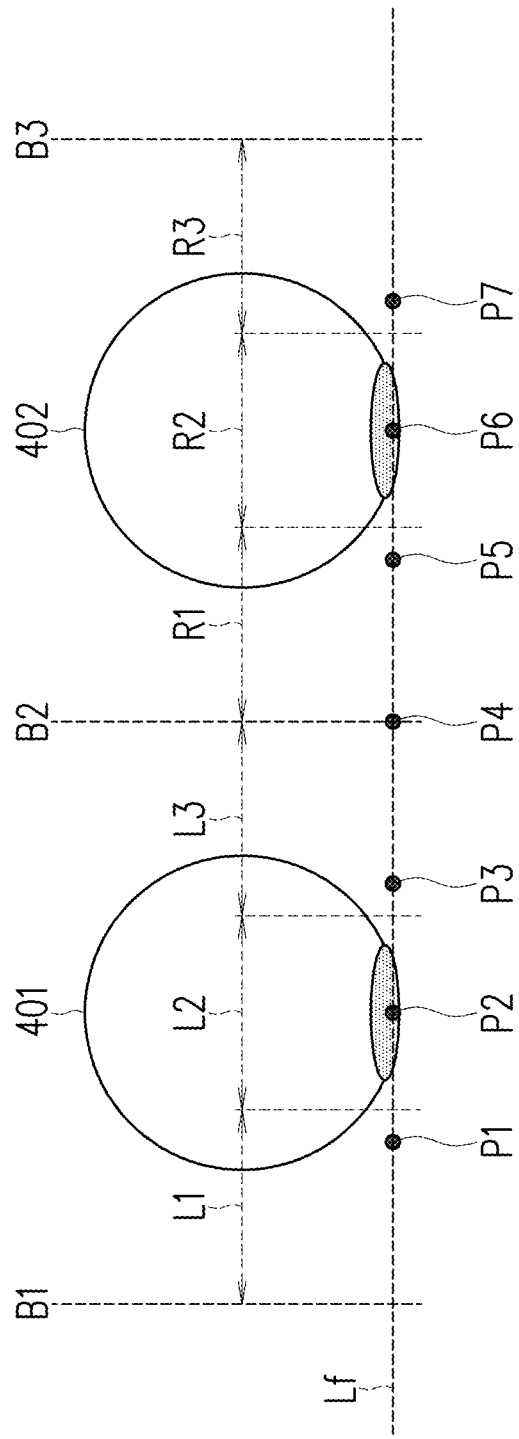
FIG. 8 is a schematic view showing the distribution of viewpoints according to another embodiment of the disclosure.

FIG. 8 is a schematic view showing the distribution of viewpoints according to another embodiment of the disclosure. Referring to FIG. 1 and FIG. 7, in one embodiment, the left eye viewpoints P1 to P3, the center viewpoint P4, and the right eye viewpoints P5 to P7 are distributed on a reference line Lf parallel to a viewing plane. In addition, the viewpoint amount of region L1 (high crosstalk region) is equal to the viewpoint amount of region R3 (high crosstalk region). The viewpoint amount of region L3 (high crosstalk region) is equal to the viewpoint amount of region R1 (high crosstalk region). In this regard, the processor 110 may also perform the light intensity comparison and processing on the left eye viewpoints P1 and P3 and the right eye viewpoints P5 and P7 of FIG. 8 as described in the embodiment of FIG. 4, so as to effectively improve the image crosstalk seen by the left eye 401 and the right eye 402. However, for the central viewpoint P4, the processor 110 may also regard the central viewpoint P4 as the right eye viewpoint or the left eye viewpoint and process the same accordingly.

Figure 9:
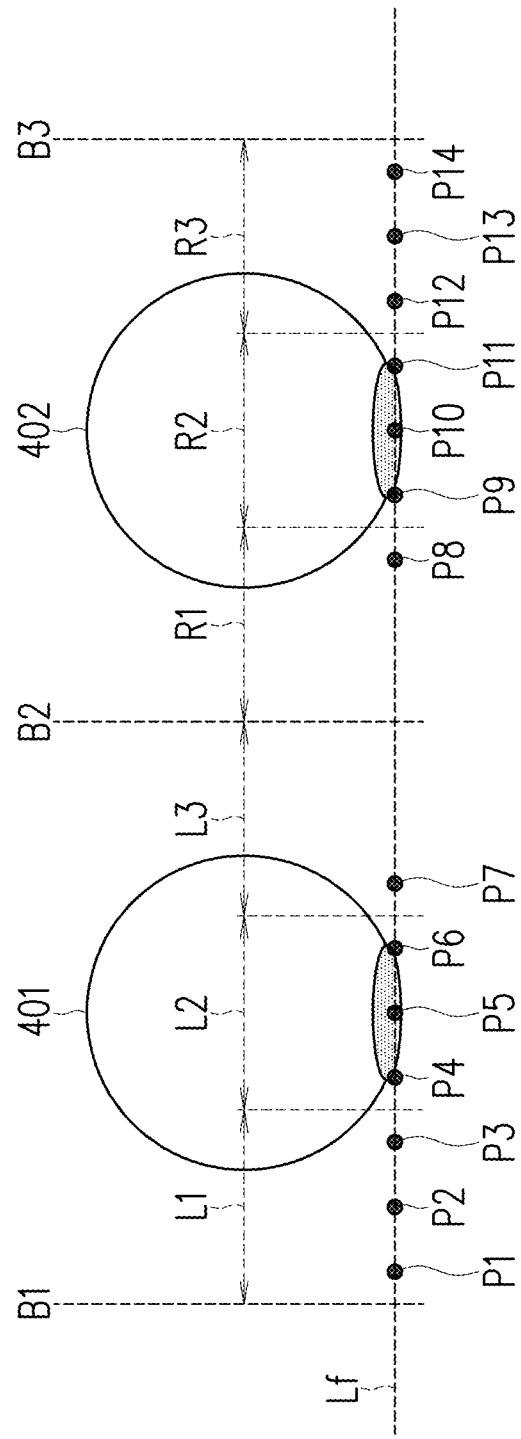
FIG. 9 is a schematic view showing the distribution of viewpoints according to another embodiment of the disclosure.

FIG. 9 is a schematic view showing the distribution of viewpoints according to another embodiment of the disclosure. Referring to FIG. 1 and FIG. 9, in one embodiment, the left eye viewpoints P1 to P7 and the right eye viewpoints P8 to P14 are distributed on a reference line Lf parallel to the viewing plane. Moreover, the viewpoint amount of region L1 (high crosstalk region) is greater than the viewpoint amount of region L3 (high crosstalk region). The viewpoint amount of region R3 (high crosstalk region) is greater than the viewpoint amount of region R1 (high crosstalk region). In this regard, the processor 110 may also perform the light intensity comparison and processing on the left eye viewpoints P1 to P3 and P7 and the right eye viewpoints P8 and P12 to P14 of FIG. 9 as described in the embodiment of FIG. 4, so as to effectively improve the image crosstalk seen by the left eye 401 and the right eye 402.

In some embodiments of the disclosure, when a reference pattern is input after the light splitting unit (lens layer) is removed from a display, then by simply calculating the number of borders of the pattern displayed on the display, it is possible to determine whether the distribution result of the corresponding viewpoint matches the manner of distribution described in the above embodiments of the disclosure.

In some embodiments of the disclosure, grayscale values of 0 to 255 may be sequentially input for all viewpoints in the high crosstalk region of a display, and when there are any values that remain unchanged after adjustment, they are the light intensity of the right standard viewpoint and the left standard viewpoint described in the above embodiments of the disclosure. Next, by using the light intensity of the right standard viewpoint and the left standard viewpoint, which remain unchanged, and inputting images of different brightness to the display to generate a plurality of corresponding light intensities for substituting into the above Equation (1) and Equation (2), a plurality of equations such as the above Equation (1) and Equation (2) may be obtained. Thus, the plurality of equations may be solved by simultaneous operations to obtain corresponding ratio values, thereby matching the light intensity adjustment means described in the above embodiments.

In summary, the three-dimensional display device and the display method disclosed herein may define a high crosstalk region and a low crosstalk region of a viewing plane and compare the light intensity of at least one of at least one left eye viewpoint and at least one right eye viewpoint in the high crosstalk region with the light intensity of the corresponding standard viewpoint to automatically reduce the light intensity of at least one of the at least one left eye viewpoint and at least one right eye viewpoint, so as to effectively reduce the image crosstalk of at least one of the left eye and the right eye.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure.

What is claimed is:

1. A three-dimensional display device, comprising:
   an eye tracking device, configured to track a left eye position and a right eye position;
   a processor, coupled to the eye tracking device and configured to calculate a plurality of left eye viewpoints and a plurality of right eye viewpoints according to the left eye position and the right eye position and generate a plurality of views; and
   a display, coupled to the eye tracking device and the processor and comprising:
      a plurality of light emitting units, configured to emit a plurality of beams of light; and
      a plurality of light splitting units, configured to distribute a plurality of beams of light emitted by the plurality of light emitting units,
   wherein the processor calculates opening angles and light paths of the plurality of beams of light emitted by the plurality of light emitting units passing through the plurality of light splitting units to generate viewpoints through which the plurality of beams of light pass,
   wherein at least one beam of the plurality of beams of light passes through at least one of the plurality of left eye viewpoints and at least one of the plurality of right eye viewpoints simultaneously, and wherein the processor performs a light intensity comparison and post-processing on views corresponding to the at least one of the plurality of left eye viewpoints and the at least one of the plurality of right eye viewpoints.

2. The three-dimensional display device according to claim 1, wherein the processor selects a left standard viewpoint from the at least one of the plurality of left eye viewpoints, and the left standard viewpoint corresponds to a light intensity of a left standard view, and the processor selects a right standard viewpoint from the at least one of the plurality of right eye viewpoints, and the right standard viewpoint corresponds to a light intensity of a right standard view, and wherein the processor performs a light intensity comparison and post-processing on views corresponding to the at least one of the plurality of left eye viewpoints and the at least one of the plurality of right eye viewpoints according to the following Equation (1) and Equation (2), $$Rv'=Rv-|Rv-Ls|\times Ra \qquad \text{Equation (1)}$$

$$Lv'=Lv-|Lv-Rs|\times La \qquad \text{Equation (2)}$$

where $Rv'$ is a light intensity of a view corresponding to any one of the plurality of right eye viewpoints for comparison and post-processing, $Rv$ is a light intensity of a view corresponding to any one of the plurality of right eye viewpoints, $Ls$ is the light intensity of the left standard view corresponding to the left standard viewpoint, $Ra$ is a first ratio value, $Lv'$ is a light intensity of a view corresponding to any one of the plurality of left eye viewpoints for comparison and post-processing, $Lv$ is a light intensity of a view corresponding to any one of the plurality of left eye viewpoints, $Rs$ is the light intensity of the right standard view corresponding to the right standard viewpoint, and $La$ is a second ratio value.

3. The three-dimensional display device according to claim 2, wherein when a value obtained by subtraction between a light intensity of a view corresponding to any one of the plurality of right eye viewpoints and the light intensity of the left standard view corresponding to the left standard viewpoint and taking an absolute value is less than a first threshold value, the processor maintains a light intensity of a view corresponding to any one of the plurality of right eye viewpoints, and wherein when a value obtained by subtraction between a light intensity of a view corresponding to any one of the plurality of left eye viewpoints and the light intensity of the right standard view corresponding to the right standard viewpoint and taking an absolute value is less than a second threshold value, the processor maintains a light intensity of a view corresponding to any one of the plurality of left eye viewpoints.

4. The three-dimensional display device according to claim 2, wherein the first ratio value is proportional to a right eye crosstalk rate, and the second ratio value is proportional to a left eye crosstalk rate.

5. The three-dimensional display device according to claim 2, wherein the processor calculates a plurality of crosstalk rates in the plurality of beams of light according to the left eye position and the right eye position, defines a viewpoint region corresponding to a portion among the plurality of crosstalk rates being greater than or equal to a first crosstalk rate threshold value and less than or equal to a second crosstalk rate threshold value as a high crosstalk region, and defines a viewpoint region corresponding to a portion among the plurality of crosstalk rates being less than the first crosstalk rate threshold value and greater than the second crosstalk rate threshold value as a low crosstalk region, and wherein the processor performs a light intensity comparison and post-processing on views corresponding to the at least one of the plurality of left eye viewpoints and the at least one of the plurality of right eye viewpoints in the high crosstalk region.

6. The three-dimensional display device according to claim 5, wherein when the high crosstalk region is located between a left eye center and a right eye center and more than two viewpoints are located in the high crosstalk region, a plurality of first ratio values corresponding to different right eye viewpoints decrease as approaching the right eye position, and a plurality of second ratio values corresponding to different left eye viewpoints decrease as approaching the left eye position.

7. The three-dimensional display device according to claim 5, wherein when the high crosstalk region is located outside a pair of eyes and more than two viewpoints are located in the high crosstalk region, first ratio values corresponding to different right eye viewpoints decrease as approaching the right eye position, and second ratio values corresponding to different left eye viewpoints decrease as approaching the left eye position.

8. The three-dimensional display device according to claim 1, wherein the plurality of left eye viewpoints and the plurality of right eye viewpoints are non-uniformly distributed on a reference line.

9. The three-dimensional display device according to claim 1, wherein an amount of the plurality of left eye viewpoints and the plurality of right eye viewpoints between the left eye position and the right eye position is greater than or equal to an amount located outside the left eye position and the right eye position.

10. The three-dimensional display device according to claim 1, wherein the three-dimensional display device is a naked-eye three-dimensional image display device.

11. A display method, adapted to a three-dimensional display device, wherein the three-dimensional display device comprises an eye tracking device and a display, and the display method comprises:
tracking a left eye position and a right eye position through the eye tracking device;
calculating a plurality of left eye viewpoints and a plurality of right eye viewpoints according to the left eye position and the right eye position and generating a plurality of views;
emitting a plurality of beams of light through a plurality of light emitting units of the display;
distributing a plurality of beams of light emitted by the plurality of light emitting units through a plurality of light splitting units of the display;
calculating opening angles and light paths of the plurality of beams of light emitted by the plurality of light emitting units passing through the plurality of light splitting units to generate viewpoints through which the plurality of beams of light pass, wherein at least one beam of the plurality of beams of light passes through at least one of the plurality of left eye viewpoints and at least one of the plurality of right eye viewpoints simultaneously; and
performing a light intensity comparison and post-processing on views corresponding to the at least one of the plurality of left eye viewpoints and the at least one of the plurality of right eye viewpoints.

12. The display method according to claim 11, wherein performing a light intensity comparison and post-processing on views corresponding to the at least one of the plurality of left eye viewpoints and the at least one of the plurality of right eye viewpoints comprises:
  selecting a left standard viewpoint from the at least one of the plurality of left eye viewpoints, wherein the left standard viewpoint corresponds to a light intensity of a left standard view;
  selecting a right standard viewpoint from the at least one of the plurality of right eye viewpoints, wherein the right standard viewpoint corresponds to a light intensity of a right standard view; and
  performing a light intensity comparison and post-processing on views corresponding to the at least one of the plurality of left eye viewpoints and the at least one of the plurality of right eye viewpoints according to the following Equation (1) and Equation (2), $$Rv'=Rv-|Rv-Ls|\times Ra \qquad \text{Equation (1)}$$

$$Lv'=Lv-|Lv-Rs|\times La \qquad \text{Equation (2)}$$

where $Rv'$ is a light intensity of a view corresponding to any one of the plurality of right eye viewpoints for comparison and post-processing, $Rv$ is a light intensity of a view corresponding to any one of the plurality of right eye viewpoints, $Ls$ is the light intensity of the left standard view corresponding to the left standard viewpoint, $Ra$ is a first ratio value, $Lv'$ is a light intensity of a view corresponding to any one of the plurality of left eye viewpoints for comparison and post-processing, $Lv$ is a light intensity of a view corresponding to any one of the plurality of left eye viewpoints, $Rs$ is the light intensity of the right standard view corresponding to the right standard viewpoint, and $La$ is a second ratio value.

13. The display method according to claim 12, wherein performing a light intensity comparison and post-processing on views corresponding to the at least one of the plurality of left eye viewpoints and the at least one of the plurality of right eye viewpoints further comprises:
  when a value obtained by subtraction between a light intensity of a view corresponding to any one of the plurality of right eye viewpoints and the light intensity of the left standard view corresponding to the left standard viewpoint and taking an absolute value is less than a first threshold value, maintaining a light intensity of a view corresponding to any one of the plurality of right eye viewpoints; and
  when a value obtained by subtraction between a light intensity of a view corresponding to any one of the plurality of left eye viewpoints and the light intensity of the right standard view corresponding to the right standard viewpoint and taking an absolute value is less than a second threshold value, maintaining a light intensity of a view corresponding to any one of the plurality of left eye viewpoints.

14. The display method according to claim 12, wherein the first ratio value is proportional to a right eye crosstalk rate, and the second ratio value is proportional to a left eye crosstalk rate.

15. The display method according to claim 12, wherein performing a light intensity comparison and post-processing on views corresponding to the at least one of the plurality of left eye viewpoints and the at least one of the plurality of right eye viewpoints further comprises:
  calculating a plurality of crosstalk rates in the plurality of beams of light according to the left eye position and the right eye position; defining a viewpoint region corresponding to a portion among the plurality of crosstalk rates being greater than or equal to a first crosstalk rate threshold value and less than or equal to a second crosstalk rate threshold value as a high crosstalk region;
  defining a viewpoint region corresponding to a portion among the plurality of crosstalk rates being less than the first crosstalk rate threshold value and greater than the second crosstalk rate threshold value as a low crosstalk region; and
  performing a light intensity comparison and post-processing on views corresponding to the at least one of the plurality of left eye viewpoints and the at least one of the plurality of right eye viewpoints in the high crosstalk region.

16. The display method according to claim 15, wherein when the high crosstalk region is located between a left eye center and a right eye center and more than two viewpoints are located in the high crosstalk region, a plurality of first ratio values corresponding to different right eye viewpoints decrease as approaching the right eye position, and a plurality of second ratio values corresponding to different left eye viewpoints decrease as approaching the left eye position.

17. The display method according to claim 15, wherein when the high crosstalk region is located outside a pair of eyes and more than two viewpoints are located in the high crosstalk region, first ratio values corresponding to different right eye viewpoints decrease as approaching the right eye position, and second ratio values corresponding to different left eye viewpoints decrease as approaching the left eye position.

18. The display method according to claim 11, wherein the plurality of left eye viewpoints and the plurality of right eye viewpoints are non-uniformly distributed on a reference line.

19. The display method according to claim 11, wherein an amount of the plurality of left eye viewpoints and the plurality of right eye viewpoints between the left eye position and the right eye position is greater than or equal to an amount located outside the left eye position and the right eye position.

20. The display method according to claim 11, wherein the three-dimensional display device is a naked-eye three-dimensional image display device.

* * * * *